Figure 1:
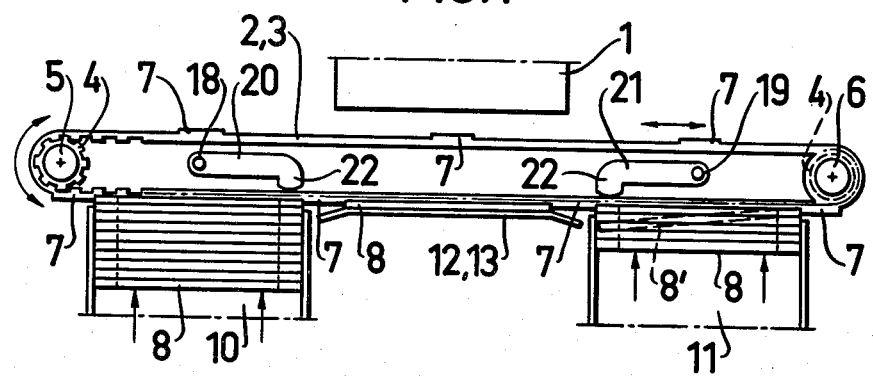

United States Patent [19]

Carlson

[11] 4,368,964

[45] Jan. 18, 1983

[54] SLIDE PROJECTOR WITH STATIONARY SLIDE MAGAZINES AND AUTOMATIC SLIDE CHANGER

[75] Inventor: Ulf R. Carlson, Gothenburg, Sweden

[73] Assignee: Victor Hassel Blad Aktiebilag, Gothenburg, Sweden

[21] Appl. No.: 176,148

[22] Filed: Aug. 7, 1980

[30] Foreign Application Priority Data

Aug. 29, 1979 [SE] Sweden ............................ 7907194

[51] Int. Cl.³ .............................................. G03B 23/08
[52] U.S. Cl. .................................... 353/113; 353/109; 353/116; 353/118
[58] Field of Search ................ 353/109, 113, 118, 116

[56] References Cited

U.S. PATENT DOCUMENTS 2,594,162 4/1952 Hartley ................................. 353/113
3,216,138 11/1965 Walter ................................... 353/116

FOREIGN PATENT DOCUMENTS 12598 3/1956 Fed. Rep. of Germany ....... 353/113
55-134834 10/1980 Japan ................................... 353/113

Primary Examiner—Steven L. Stephan
Attorney, Agent, or Firm—Sherman & Shalloway

[57] ABSTRACT

The invention relates to a slide projector with automatic slide changer and stationary slide magazines (10,11) on each side of the optical pathway of the projector, the respective slide magazine (10,11) provided in the shortside with a feed and discharge opening for slide frames (8) which is located in the focal plane of the slide projector. Between the slide magazines (10,11) a slide frame transport device is located, which consists of two toothed belts (2,3) provided with external dog members (7) for transporting the slide frames (8) from one slide magazine (10) to the other (11), and vice versa. In the projection position of the slide projector support members (12,13 and, respectively, 16,17) facing to the toothed belts (2,3) are provided for the slide frames (8). Levers (20,21) are provided behind the toothed belts (2,3) directly in front of the respective slide magazine (10,11) for inserting the slide frames (8).

5 Claims, 3 Drawing Figures

SLIDE PROJECTOR WITH STATIONARY SLIDE MAGAZINES AND AUTOMATIC SLIDE CHANGER

This invention to slide projectors for showing slides mounted in frames and especially to a slide projector including slide magazine on either side of the optical pathway with an improved slide transport device for transporting individual slides from one slide magazine to the other in either direction via the projection position.

The majority of known slide projectors with automatic slide change are equipped with exchangeable slide magazines, which include separate compartments for the individual slide frames and are of circular or straight type. A few known slide projectors operate with slides, which are placed directly one against the other. It is further known to insert the slide frames into pockets in an endless articulated web, which is stepped through the slide projector.

Slide magazines including separate compartments have the advantage, when they are provided with a dust-proof cover, of serving as storage boxes for completely edited slide programs, which are rapidly and easily accessible for projection. Compared with simple, internally non-compartmented boxes with cover in which the slide frames are intended to be stored side by side, the compartmented slide magazines are substantially more expensive and, besides, require a multiple of volume for storing the same number of slide frames. These are evident disadvantages, especially in the case of large numbers if slides. The insignificant additional work involved in moving the slide frames in a slide program from a box to a slide projector equipped with stationary slide magazine, is in most cases nothing to speak of. It is, therefore, desirable to provide slide projectors with simple stationary slide magazines for slide frames laid adjacent one another.

The automatic slide changers mounted on known slide projectors, especially on such provided with exchangeable slide magazines, often involve relatively complicated electro-mechanical mechanisms. A simplified design operating with stationary slide magazines, which are not divided into compartments, therefore, is desired.

U.S. Pat. No. 3,216,138 discloses a method of continuously showing a slide program. In principle, the method implies that the show is started from one end of the slide magazine and that every second slide is shown until the show has arrived at the last slide, whereafter the direction of movement of the slide magazine or, when applicable, of the slides, is reversed so that on the return movement the slides previously lost are shown. It is thereby possible, within the capacity of the slide magazine, to include in the slide program the desired number of slides, without at continuous show being disturbed by a long break between the last slide and the first slide of the program. An object of the present invention is to provide a slide projector, which is capable for use at the afore-described known continuous showing method.

The aforesaid objects are achieved according to the invention by providing an improved reversible slide transport device.

According to the invention, stationary slide magazines of open or closed type are located on opposed sides of the optical pathway of the slide projector, and forward facing openings of the slide magazines are located in the focal plane of the slide projector. Slides positioned in the slide magazines are pushed forward to the openings by springs provided in the rear portions of the slide magazines. A slide changer for stepping the slides from one slide magazine to the other, and vice versa, via the projection position of the slide projector, is located in the focal plane between the slide magazines. The slide changer consists in principle of two toothed belts, which run over gear wheels mounted on a driven and, respectively, a free-wheeling axle, which axles extend perpendicularly to the optical pathway and are located outside the respective slide magazine. Slide dogs in the form of protuberances are so arranged on the outside of the toothed belts, that the distance between two dogs corresponds to the width of a slide frame. The distance of the axles relative to one another is chosen so that whole slide frame divisions, preferably seven, are obtained on the belts. The toothed belts catch the slide frames at the level of two opposed sides of the slide frame, and the belt width is chosen so that the gate of the slide frame remains free for the optical pathway. In the projection position, i.e. between the slide magazines and facing to the toothed belts, a support means is provided for maintaining the slides in the focal plane. The support means consist of a pair of guide strips or a pair of freely following support belts, or a similar arrangement. In front of the slide magazine openings, a feeding device is located, which feeds the slide frames into one of the slide magazines which, depending on the rotation direction of the toothed belts at a given occasion, serves as receiving magazine. The feeding device, for example, may consist of levers, which are disposed within respective toothed belt loops and upon feeding press the slide frame out of the grip by the dogs and into the slide magazine. A program mechanism, which is not, per se, part of the present invention, automatically controls the stepped advancing of the toothed belts, reverses their rotation direction and operates the feeding device.

Figure 2:
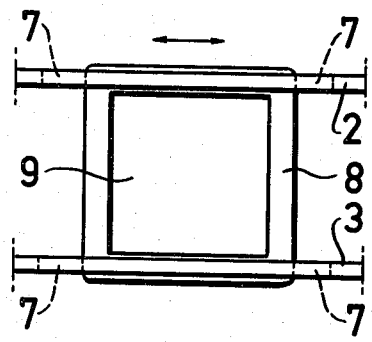
Figure 3:
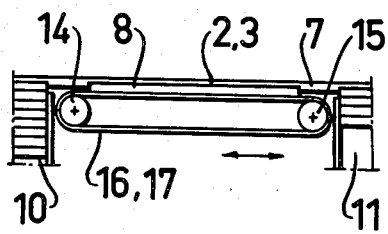

The invention is described in greater detail in the following, with reference to the accompanying basic drawing, in which FIG. 1 is a view from above of a preferred embodiment of slide projector details concerned by the present invention, FIG. 2 is a vertical view of a detail comprised in the slide changer of the slide projector, and FIG. 3 is a horizontal view of an alternative embodiment of one of the details shown in FIG. 1.

On a slide projector according to the invention, FIG. 1, a slide changer is located behind a lens 1 and comprises an upper toothed belt 2 and a lower toothed belt 3, which run over gear wheels 4 mounted on two vertical axles 5,6. One of the axles is a free-wheeling one and one is driven by a program mechanism not concerned by the present invention. The toothed belts 2,3 are provided on their outside with slide dogs 7, which are so arranged straight above one another, that the free distance between them corresponds to the width of a slide frame 8. The length of the toothed belts 2,3 is so adjusted, that the number of slide frame divisions is an integer figure, which in FIG. 1 is seven. Vertically the toothed belts 2,3 are arranged so that they engage about the upper and lower portions of the slide frames 8. The associated gate 9, FIG. 2, however is not covered by the belts, which in relation to the lens 1 are arranged so that a slide frame 8, which is located in a slide frame division on that side of the toothed belts 2,3 which is remote from the lens 1, will be located in the focal plane of the lens.

On both sides of the optical pathway of lens 1 horizontal slide magazines 10,11 are located, which are intended to hold the adjacently positioned slide frames 8 included in a slide program. A free opening of the slide magazines 10 and, respectively, 11 is so located in the focal plane of lens 1, that the slide frames 8 are engaged by the toothed belts 2,3 in the way shown in FIG. 2. Each side magazine 10,11 is provided with a magazine spring (not shown), which press the slide frames 8 in the direction of the arrow all the way to the toothed belts 2,3. The slide magazines 10,11 in general can be designed open or closed, and be charged with slide frames from above, from the side or from the shortside remote from the slide changer, which, however, is not shown here as these embodiments are not concerned by the present invention. For guiding the slide frames 8 so as to prevent them from falling out when they are passing the projection position of the slide projection between the slide magazines 10,11, two support strips 12,13 are located directly in front of the toothed belts 2 and, respectively, 3. Said support strips 12,13 alternatively may be replaced by two support belts 16,17 mounted on two free-wheeling axles 14,15 as shown in FIG. 3. Between the slide magazines 10 and 11, on the same level as their bottom, a horizontal slideway (not shown) is provided, which prevents the slide frames 8 from falling out of the toothed belts 2,3.

For feeding a slide frame 8 shown into the slide magazine 10 or 11, which at the occasion in question serves as receiving magazine, feeding means in the form of lever pairs 20 and, respectively, 21 pivoted about axles 18,19 and controlled by the program mechanism are located within the toothed belts 2,3. Said levers 20,21 are provided with short protuberances 22 directly in front of the edges of the slide frames 8 in the slide magazines 10,11 which are closest to the optical pathway of the slide projector.

The mode of operation of a slide projector according to the invention is described in greater detail in the following, with reference to FIG. 1, which illustrates the situation prevailing while a slide program is being shown. Slide frames 8 are located both in the slide magazine 10 and, respectively, 11 and in intermediate projection position. It is presupposed, as pointed out above, that the slide projector comprises drive and control means for the slide changer which are not concerned by the present invention. It is now assumed, that the slide frames 8 are to be moved from the slide magazine 10 to the slide magazine 11. The toothed belts 2,3 then are driven counterclockwise one slide frame division at a time, with an intermediate projection interval, which is determined by the aforementioned control means. At slide change, the lever pair 21 press against the slightly resilient toothed belts 2,3 whereby the slide frame 8, which in starting position is in front of the opening of the slide magazine 11, is pressed inward against the action of the counterholding magazine spring (not shown) in the way illustrated by an oblique dashed slide frame 8'. Thereafter, the toothed belts 2,3 are driven counterclockwise through one slide frame division, whereby the slide frame, which had been in projection position, is moved inward beneath the slide frame 8' which thereby assumes a position in parallel with the remaining slide frames in the slide magazine 11. The slide frame 8, which originally was located directly in front of the slide magazine 10, now has assumed projection position, at the same time as the magazine spring in the slide magazine 10 presses a new slide frame 8 into the space between two slide dogs 7 on the toothed belts 2,3 which now has advanced to the position in front of the opening of the slide magazine 10. This cycle is repeated as long as there are slides remaining to be shown in this feed direction. After the last slide has been shown, the direction of movement of the toothed belts 2,3 is reversed to clockwise direction, and the lever pair 20 are used for pressing the slide frames 8 into the slide magazine 10. By causing the control means to show every second slide, the slide projector can be used for continuously showing a slide program in the way disclosed in U.S. Pat. No. 3,216,138.

The invention is not restricted to the embodiments here described, but can be varied considerably within the invention idea. The toothed belts 2,3, for example, can be designed as a single wide belt, with recesses for the gates 9 and with transverse ribs aligned with the slide dogs 7. It is also possible to replace the toothed belts by a chain construction. It also is easily understood, that the slide magazines 10,11 can be replaced by vertical ones, which open downward, in which case the toothed belts 2,3 are arranged for horizontal transport of the slide frames 8, and the optical pathway of the slide projector is turned through 90° with a prism or mirror. Also constructions with horizontal slide magazines arranged above or beneath the optical pathway of the slide projector can be imagined.

What I claim is:

1. In a slide projector having an optical pathway comprising first and second slide magazines for housing individual slides mounted in slide frames, said first and second magazines being located on opposite sides of the optical pathway of the slide projector, each of said first and second magazines including a feed and discharge opening for receiving and discharging said slide frames, said opening being located in the focal plane of the slide projector, and a reversible slide transport device for transporting the slide frames between said first and second magazines through said respective feed and discharge openings, via the projection position of said projector for projecting said individual slides, the improvement wherein said slide transport device comprises first and second toothed belts located in said focal plane, first and second gear wheels attached on first and second axles, respectively, said axles being located, respectively, outside said first and second magazines, in a direction perpendicular to said optical pathway, said toothed belts being stretched over said gear wheels, at least one of said first and second axles being driven, and, a plurality of external dog members carried on the periphery of each of said first and second belts, said dog members being spaced one from the other a distance corresponding to the width of one of said slide frames, said toothed belts each having a length which corresponds to an integer number of slide frame divisions, whereby, when said toothed belts are driven in one direction by said axles and gear wheels, said slide frames will be individually transported in said plane by and in engagement between consecutive of said dog members from said first slide magazine to said second slide magazines, via said projection position, and when said toothed belts are driven in the opposite direction by said axles and gear wheels said slide frames will be individually transported in said focal plane by and in engagement between consecutive of said dog members from said second slide magazine to said first slide magazine, via said projection position.

2. A slide projector as defined in claim 1 which further comprises a pair of support strips located directly in front of said first and second toothed belts, in the projection position of said slide projector, to support a slide frame in said projection position.

3. A slide projector as defined in claim 1 which further comprises a pair of support belts located directly in front of said first and second toothed belts, in the projection position of said slide projector, to support a slide frame in said projection position.

4. A slide projector as defined in any one of claims 1, 2 or 3 which further comprises first and second pairs of levers located behind said toothed belts and opposite said first and second slide magazines, respectively, each of said lever pairs being independently movable to an operative position which causes a slide and associated slide frame in the respective slide magazine to tilt away from the feed opening of said slide magazine, to thereby allow a slide and associated slide frame to be transported from said projection position into said respective slide magazine through said feed opening.

5. A slide projector as defined in claim 4 wherein each of first and second pairs of levers comprises an axle about which said pairs of levers is pivotable, and a protuberance at the end of each lever of said pair of levers opposite said axle, said protuberances being located opposite the edge of a slide frame in the respective slide magazine which is closest to the optical pathway of said slide projector, whereby said protuberances contact said edge when said lever pair is moved to said operative position.

* * * * *